United States Patent
Huang et al.

(10) Patent No.: US 9,361,670 B2
(45) Date of Patent: Jun. 7, 2016

(54) METHOD AND SYSTEM FOR IMAGE HAZE REMOVAL BASED ON HYBRID DARK CHANNEL PRIOR

(71) Applicant: National Taipei University of Technology, Taipei (TW)

(72) Inventors: Shih-Chia Huang, Taipei (TW); Bo-Hao Chen, Taipei (TW); Yi-Jui Cheng, Tainan (TW)

(73) Assignee: National Taipei University of Technology, Taipei (TW)

( * ) Notice: Subject to any disclaimer, the term of this patent is extended or adjusted under 35 U.S.C. 154(b) by 91 days.

(21) Appl. No.: 14/476,751

(22) Filed: Sep. 4, 2014

(65) Prior Publication Data

US 2016/0071244 A1    Mar. 10, 2016

(51) Int. Cl.
*G06K 9/40* (2006.01)
*G06T 5/00* (2006.01)
(Continued)

(52) U.S. Cl.
CPC .......... *G06T 5/002* (2013.01); *G06K 9/00624* (2013.01); *G06K 9/4652* (2013.01); *G06T 5/003* (2013.01); *G06T 5/009* (2013.01); *G06T 2207/10024* (2013.01); *G06T 2207/20008* (2013.01); *G06T 2207/20024* (2013.01);
(Continued)

(58) Field of Classification Search
CPC ....... G06K 9/00; G06K 9/40; G06K 9/00624; G06K 9/4642; H04N 1/6027; G06T 5/001; G06T 5/002; G06T 5/003; G06T 5/009; G06T 5/10; G06T 5/40; G06T 5/50; G06T 7/003; G06T 7/2006; G06T 7/2013; G06T 7/2026; G06T 7/204; G06T 7/2066; G06T 2207/10004; G06T 2207/10016; G06T 2207/10024; G06T 2207/20012; G06T 2207/20016; G06T 2207/2021; G06T 2207/20028; G06T 2207/20052; G06T 2207/20076; G06T 2207/20192; G06T 2207/001
See application file for complete search history.

(56) References Cited

U.S. PATENT DOCUMENTS 8,340,461 B2 * 12/2012 Sun ........................... G06K 9/40
358/3.26
8,755,628 B2 * 6/2014 Fang ....................... G06T 5/009
382/274
(Continued)

OTHER PUBLICATIONS

Kanhere et al., "A Taxonomy and Analysis of Camera Calibration Methods for Traffic Monitoring Applications," IEEE Transactions on Intelligent Transportation Systems, Jun. 2010, pp. 441-452.
(Continued)

*Primary Examiner* — Jose Couso
(74) *Attorney, Agent, or Firm* — Jianq Chyun IP Office

(57) ABSTRACT

A method and a system for image haze removal are provided. The method includes the following steps: receiving an input hazy image including input pixels; determining a hybrid dark channel for each of the input pixels according to a first minimum dark channel of a corresponding large local patch and a second minimum dark channel of a corresponding small local patch; determining a transmission map for each of the input pixels according to the hybrid dark channel prior, the corresponding hybrid dark channel, and atmospheric light associated with the input hazy image in each color channel; determining a color spectrum adjustment parameter corresponding to each of the color channels; recovering scene radiance for each of the input pixels in each of the color channels according to the corresponding color spectrum adjustment parameter, the transmission map, and the corresponding atmospheric light to produce and output a de-hazed image.

16 Claims, 4 Drawing Sheets

(51) Int. Cl.
*G06K 9/00* (2006.01)
*G06K 9/46* (2006.01)

(52) U.S. Cl.
CPC ............... *G06T2207/20192* (2013.01); *G06T 2207/30232* (2013.01)

(56) References Cited

U.S. PATENT DOCUMENTS 9,031,345 B2* 5/2015 Jin .......................... G06T 5/003
382/254
9,177,363 B1* 11/2015 Huang .................... G06T 5/001
9,197,789 B2* 11/2015 Mukhopadhyay ........ G06T 5/40

OTHER PUBLICATIONS

Tarel et al., "Vision Enhancement in Homogeneous and Heterogeneous Fog," IEEE Intelligent Transportation Systems Magazine, Jun. 2012, pp. 6-20.
Buch et al., "A Review of Computer Vision Techniques for the Analysis of Urban Traffic," IEEE Transactions on Intelligent Transportation Systems, Sep. 2011, pp. 920-939.
Caraffa et al., "Markov Random Field Model for Single Image Defogging," IEEE Intelligent Vehicles Symposium (IV), Jun. 23-26, 2013, pp. 994-999.
Tarel et al., "Fast Visibility Restoration from a Single Color or Gray Level Image," IEEE 12th International Conference on Computer Vision, Sep. 29, 2009-Oct. 2, 2009, pp. 2201-2208.
Shih-Chia Huang, "An Advanced Motion Detection Algorithm with Video Quality Analysis for Video Surveillance Systems," IEEE Transactions on Circuits and Systems for Video Technology, Jan. 2011, pp. 1-14.
Cheng et al., "Scene Analysis for Object Detection in Advanced Surveillance Systems Using Laplacian Distribution Model," IEEE Transactions on Systems, Man, and Cybernetics, Part C: Applications and Reviews, Sep. 2011, pp. 589-598.
Huang et al., "Automatic Moving Object Extraction Through a Real-World Variable-Bandwidth Network for Traffic Monitoring Systems," IEEE Transactions on Industrial Electronics, Apr. 2014, pp. 2099-2112.
Cheng et al., "Accurate Motion Detection Using a Self-Adaptive Background Matching Framework," IEEE Transactions on Intelligent Transportation Systems, Jun. 2012, pp. 671-679.
Dailey et al., "An Algorithm to Estimate Mean Traffic Speed Using Uncalibrated Cameras," IEEE Transactions on Intelligent Transportation Systems, Jun. 2000, pp. 98-107.
Wang et al., "A Novel Visibility Restoration Algorithm for Single Hazy Images," IEEE International Conference on Systems, Man, and Cybernetics (SMC), Oct. 13-16, 2013, pp. 847-851.
Cheng et al., "Visibility Enhancement of Single Hazy Images Using Hybrid Dark Channel Prior," IEEE International Conference on Systems, Man, and Cybernetics, Oct. 13-16, 2013, pp. 3627-3632.
Tan et al., "Enhancement of color images in poor visibility conditions," Proceedings of 2000 International Conference on Image Processing, Sep. 10-13, 2000, pp. 788-791.
Narasimhan et al., "Interactive (De)Weathering of an Image using Physical Models," IEEE Workshop on Color and Photometric Methods in Computer Vision, in Conjunction with ICCV, Oct. 2003, pp. 1-8.
Kopf et al., "Deep Photo: Model-Based Photograph Enhancement and Viewing," ACM Transactions on Graphics (TOG), Dec. 2008, pp. 1-10.
Schechner et al., "Polarization-based vision through haze," Applied Optics, Jan. 20, 2003, pp. 511-525.
Narasimhan et al., "Contrast Restoration of Weather Degraded Images," IEEE Transactions on Pattern Analysis and Machine Intelligence, Jun. 2003, pp. 713-724.
Nayar et al., "Vision in Bad Weather," The Proceedings of the Seventh IEEE International Conference on Computer Vision, Sep. 1999, pp. 820-827.
Robby Tan, "Visibility in Bad Weather from a Single Image," IEEE Conference on Computer Vision and Pattern Recognition, Jun. 23-28, 2008, pp. 1-8.
Raanan Fattal, "Single Image Dehazing," ACM Transactions on Graphics (TOG)-Proceedings of ACM SIGGRAPH 2008, Aug. 2008, pp. 1-9.
Li et al., "Single image visibility enhancement in gradient domain," IET Image Processing, Jul. 2012, pp. 589-595.
He et al., "Single Image Haze Removal Using Dark Channel Prior," IEEE Transactions on Pattern Analysis and Machine Intelligence, Dec. 2011, pp. 2341-2353.
Xie et al., "Improved Single Image Dehazing Using Dark Channel Prior and Multi-Scale Retinex," 2010 International Conference on Intelligent System Design and Engineering Application, Oct. 13-14, 2010, pp. 848-851.

* cited by examiner

METHOD AND SYSTEM FOR IMAGE HAZE REMOVAL BASED ON HYBRID DARK CHANNEL PRIOR

TECHNICAL FIELD

The present invention generally relates to a method and a system for image haze removal based on a hybrid dark channel prior.

BACKGROUND

The visibility of road images may be degraded when captured due to natural atmospheric phenomena such as haze, fog, sandstorms, and so forth. Such visibility degradation is due to the absorption and scattering of light by atmospheric particles. Road image degradation may cause problems for intelligent transportation systems (ITS) such as traveling vehicle data recorders and traffic surveillance systems, which must operate under variable weather conditions. The amount of absorption and scattering depends on the depth of the scene between a traffic camera and a scene point. Hence, scene depth information is important for recovering scene radiance in images captured in a hazy environment.

In order to improve visibility in hazy images, haze removal techniques have been recently proposed. These may be divided into two principal classifications: a given depth approach and an unknown depth approach.

The given depth approach relies on the assumption that the depth information is given, where the depth information is used for restoring hazy images. However, such approach is not suitable for haze removal in real-world applications because the depth information needs to be provided by the user. Therefore, many studies have proposed the estimation of an unknown depth to recover scene radiance in hazy images.

The unknown depth approach may be divided into two major categories: a multiple-image restoration technique and a single-image restoration technique. The multiple-image restoration technique mainly requires either a complex computation or a use of additional hardware devices. This may lead to costly restoration expenses. Hence, recent research has been focusing on the single-image restoration technique for estimating the unknown depth without any additional information to recover scene radiance in hazy images.

A prior art method proposes a single-image haze removal approach that removes haze by maximizing the local contrast of recovered scene radiance based on an observation that captured hazy images have lower contrast than restored images. However, such approach may result in unwanted feature artifact effects along depth edges. Another prior art method proposes another haze removal technique for single images that estimates the albedo of the scene and deduces the transmission map based on an assumption that the transmission shading and the surface shading are locally uncorrelated. However, such method may not contend with images featuring dense fog. Also, another prior art method describes a characteristic property in which smaller transmission intensity values possess large coefficients in a gradient domain, whereas larger transmission intensity values possess smaller coefficients. Based on the property, the visibility of hazy images may be restored by employing a multi-scale technique in the regions containing small transmission values. However, such method may result in excessive restoration with regard to the sky regions of a resultant image.

Yet another prior art proposes a haze removal algorithm via a dark channel prior technique based on an observation that at least one color channel is composed of pixels having lower intensities within local patches in outdoor haze-free images to effectively remove haze formation while only using a single image. Until now, such approach has attracted the most attention due to its ability to effectively remove haze formation while only using a single image. Inspired by the dark channel prior technique, an improved haze removal algorithm is proposed by employing a scheme consisting of a dark channel prior and a multi-scale Retinex technique for quickly restoring hazy images.

Nevertheless, the scene radiance recovered via the aforesaid dark channel prior based techniques may be accompanied by the generation of serious artifacts when a captured hazy road image contains localized light sources or color-shift problems due to sandstorm conditions. This may be problematic for many common road scenarios. For example, in inclement weather conditions, drivers may turn on headlights of vehicles and streetlights may be activated in order to improve visual perception. The aforesaid dark channel prior based techniques may fail to produce satisfactory restoration results when presented with these scenarios.

SUMMARY OF THE INVENTION

Accordingly, the disclosure is directed to a method and a system for image haze removal based on a hybrid dark channel prior, and the disclosure is able to effectively remove haze from a single image captured in real-world conditions.

The disclosure is directed to a method for image haze removal based on a hybrid dark channel prior, adapted to an electronic device, includes the following steps: receiving an input hazy image including a plurality of input pixels; deteimining a hybrid dark channel for each of the input pixels according to a first minimum dark channel of a corresponding large local patch and a second minimum dark channel of a corresponding small local patch; determining a transmission map for each of the input pixels according to the hybrid dark channel prior, the corresponding hybrid dark channel and atmospheric light associated with the input hazy image in each color channel; determining a color spectrum adjustment parameter corresponding to each of the color channels; recovering scene radiance for each of the input pixels in each of the color channels according to the corresponding color spectrum adjustment parameter, the transmission map, and the corresponding atmospheric light so as to produce a de-hazed image; and outputting the de-hazed image.

According to an exemplary embodiment of the disclosure, the step of determining the hybrid dark channel for each of the input pixels according to the first minimum dark channel of the corresponding large local patch and the second minimum dark channel of the corresponding small local patch includes: for each of the input pixels, calculating the first minimum dark channel by performing a minimum operation on each large local patch pixel of the corresponding large local patch in each of the color channels and performing a minimum filter on the corresponding large local patch; calculating the second minimum dark channel by performing the minimum operation on each small local patch pixel of the corresponding small local patch in each of the color channels and performing the minimum filter on the corresponding small local patch; allocating a first weight to the first minimum dark channel and a second weight to the second minimum dark channel so as to obtain a first weighted minimum dark channel and a second weighted minimum dark channel, where the first weight and the second weight are positive values between 0 and 1, and a summation of the first weight and the second weight is 1; and combining the first weighted minimum dark channel and the second weighted so as to obtain the hybrid dark channel.

According to an exemplary embodiment of the disclosure, the formula for determining the hybrid dark channel for each of the input pixels according to the first minimum dark channel of the corresponding large local patch and the second minimum dark channel of the corresponding small local patch includes Eq.(1):

$$J^{dark}(x, y) = \frac{\alpha}{\alpha + \beta} \min_{(i,j) \in \Omega(x,y)} \left( \min_{c \in (r,g,b)} J^c(x, y) \right) + \frac{\beta}{\alpha + \beta} \min_{(i,j) \in \mu(x,y)} \left( \min_{c \in (r,g,b)} J^c(x, y) \right) \quad \text{Eq. (1)}$$

where $J^c$ represents the de-hazed image to be obtained in the color channel c; $\Omega(x,y)$ and $\mu(x,y)$ respectively represent the large local patch and the small local patch centered at (x,y);

$$\frac{\alpha}{\alpha + \beta} \text{ and } \frac{\beta}{\alpha + \beta}$$

respectively represent the first weight and the second weight; $J^{dark}(x,y)$ represents the hybrid dark channel corresponding to the input pixel at (x,y), $$\frac{\alpha}{\alpha + \beta} \min_{(i,j) \in \Omega(x,y)} \left( \min_{c \in (r,g,b)} J^c(x, y) \right)$$

represents the first weighted minimum dark channel, and $$\frac{\beta}{\alpha + \beta} \min_{(i,j) \in \mu(x,y)} \left( \min_{c \in (r,g,b)} J^c(x, y) \right)$$

represents the second weighted minimum dark channel;

$$\min_{(i,j) \in \Omega(x,y)} \left( \min_{c \in (r,g,b)} J^c(x, y) \right)$$

represents the first minimum dark channel, and $$\min_{(i,j) \in \mu(x,y)} \left( \min_{c \in (r,g,b)} J^c(x, y) \right)$$

represents the second minimum dark channel.

According to an exemplary embodiment of the disclosure, the step of determining the transmission map for each of the input pixels according to the hybrid dark channel prior, the corresponding hybrid dark channel and the atmospheric light associated with the input hazy image in each of the color channels includes: setting the corresponding hybrid dark channel to zero for each of the input pixels; and obtaining the transmission map for each of the input pixels according to an optical model and the corresponding hybrid dark channel, where the optical model is constructed based on the atmospheric light associated with the input hazy image in each of the channels.

According to an exemplary embodiment of the disclosure, the formula for determining the transmission map for each of the input pixels according to the hybrid dark channel prior, the corresponding hybrid dark channel and the atmospheric light associated with the input hazy image in each of the color channels includes Eq.(2.2):

$$t_h(x, y) = 1 - \frac{\omega \alpha}{\alpha + \beta} \min_{(i,j) \in \Omega(x,y)} \left( \min_{c \in (r,g,b)} \frac{I^c(i, j)}{A^c} \right) - \frac{\omega \alpha}{\alpha + \beta} \min_{(i,j) \in \mu(x,y)} \left( \min_{c \in (r,g,b)} \frac{I^c(i, j)}{A^c} \right) \quad \text{Eq. (2.2)}$$

where $c \in \{r,g,b\}$, $t_h$ is the transmission map, I represents the input haze image, $I^c$ represents the input haze image in the color channel c, and $\omega$ is a constant parameter ranging between 0 and 1.

According to an exemplary embodiment of the disclosure, the step of determining the color spectrum adjustment parameter corresponding to each of the color channels includes: calculating an average of the input pixels in each of the color channels respectively and accordingly calculating the color spectrum adjustment parameter corresponding to each of the color channels.

According to an exemplary embodiment of the disclosure, the formulas for determining the color spectrum adjustment parameter corresponding to each of the color channels include Eq.(3) and Eq.(4):

$$R_{avg} = \frac{1}{MN} \sum_{x=1}^{M} \sum_{y=1}^{N} I^r(x, y) \quad \text{Eq. (3)}$$

$$G_{avg} = \frac{1}{MN} \sum_{x=1}^{M} \sum_{y=1}^{N} I^g(x, y)$$

$$B_{avg} = \frac{1}{MN} \sum_{x=1}^{M} \sum_{y=1}^{N} I^b(x, y)$$

$$\gamma^c = \frac{\frac{1}{MN} \sum_{x=1}^{M} \sum_{y=1}^{N} I^r(x, y)}{\frac{1}{MN} \sum_{x=1}^{M} \sum_{y=1}^{N} I^c(x, y)} = \frac{\sum_{x=1}^{M} \sum_{y=1}^{N} I^r(x, y)}{\sum_{x=1}^{M} \sum_{y=1}^{N} I^c(x, y)} \quad \text{Eq. (4)}$$

where $I^r(x,y)$, $I^g(x,y)$, and $I^b(x,y)$ respectively represent the input hazy image in each of the color channels, MN represents the total number of the input pixels, and $\gamma^c$ represents the color spectrum adjustment parameter for the color channel c.

According to an exemplary embodiment of the disclosure, the step of recovering the scene radiance for each of the input pixels in each of the color channels according to the corresponding color spectrum adjustment parameter, the transmission map, and the corresponding atmospheric light so as to produce the de-hazed image includes: calculating the scene radiance for each of the input pixels in each of the color channels based on the optical model with a consideration of the corresponding color spectrum adjustment parameter and a corresponding atmospheric adjustment parameter.

According to an exemplary embodiment of the disclosure, the formulas for recovering the scene radiance for each of the input pixels in each of the color channels according to the corresponding color spectrum adjustment parameter, the transmission map, and the corresponding atmospheric light so as to produce the de-hazed image include Eq.(5), Eq.(5.1), and Eq.(5.2):

$$J^c(x, y) = \frac{\gamma^c(I^c(x, y) - A^c)}{\max(t_h(x, y), t_0)} + A^c + \sigma^2(\gamma^c - 1) \qquad \text{Eq. (5)}$$

$$PMF(I_k^c) = \frac{n_k^c}{MN}, \qquad \text{Eq. (5.1)}$$

for
$k = 0, 1, \ldots, L$ $$\sigma^r = \operatorname{argmax}_{0 \le k \le L-1} PMF(I_k^r) \qquad \text{Eq. (5.2)}$$

$$\sigma^g = \frac{\operatorname{argmax}_{0 \le k \le L-1} PMF(I_k^r) + \operatorname{argmax}_{0 \le k \le L-1} PMF(I_k^g)}{2}$$

$$\sigma^b = \frac{\operatorname{argmax}_{0 \le k \le L-1} PMF(I_k^r) + \operatorname{argmax}_{0 \le k \le L-1} PMF(I_k^b)}{2}$$

where $c \in \{r,g,b\}$, $J^c$ represents the scene radiance in the de-hazed image in the color channel c, $I^c$ represents the input hazy image, $A^c$ represents the atmospheric light in the color channel c, $t_h$, represents the transmission map, $t_0$ is a lower transmission bound, $\gamma^c$ and $\sigma^c$ respectively represent the color spectrum adjustment parameter and the atmospheric adjustment parameter in the color channel c; $n_k^c$ denotes the total number of pixels with intensity $I_k^c$, L is a constant factor set equal to the maximum intensity value of the input pixels, PMF(•) denotes a probability density function.

The disclosure is directed to an image haze removal system including a storage unit and a processing unit, where the processing unit is coupled to the storage unit. The storage unit is configured to record a plurality of modules. The processing unit is configured to access and execute the modules recorded in the storage unit, where the modules include an image receiving module, a hybrid dark channel prior (HDCP) module, a color analysis (CA) module, a visibility recovery (VR) module, and an image output module. The image receiving module receives an input hazy image including a plurality of input pixels. The HDCP module determines a hybrid dark channel for each of the input pixels according to a first minimum dark channel of a corresponding large local patch and a second minimum dark channel of a corresponding small local patch as well as determines a transmission map for each of the input pixels according to the hybrid dark channel prior, the corresponding hybrid dark channel and atmospheric light associated with the input hazy image in each color channel. The CA module determines a color spectrum adjustment parameter corresponding to each of the color channels. The VR module recovers scene radiance for each of the input pixels in each of the color channels according to the corresponding color spectrum adjustment parameter, the transmission map, and the corresponding atmospheric light so as to produce a de-hazed image. The image output module outputs the de-hazed image.

According to an exemplary embodiment of the disclosure, for each of the input pixels, the HDCP module calculates the first minimum dark channel by performing a minimum operation on each large local patch pixel of the corresponding large local patch in each of the color channels and performing a minimum filter on the corresponding large local patch, calculates the second minimum dark channel by performing the minimum operation on each small local patch pixel of the corresponding small local patch in each of the color channels and performing the minimum filter on the corresponding small local patch, allocates a first weight to the first minimum dark channel and a second weight to the second minimum dark channel so as to obtain a first weighted minimum dark channel and a second weighted minimum dark channel, and combines the first weighted minimum dark channel and the second weighted so as to obtain the hybrid dark channel, where the first weight and the second weight are positive values between 0 and 1, and a summation of the first weight and the second weight is 1.

According to an exemplary embodiment of the disclosure, the formulas that the HDCP module determines the hybrid dark channel for each of the input pixels according to the first minimum dark channel of the corresponding large local patch and the second minimum dark channel of the corresponding small local patch include Eq.(1):

$$J^{dark}(x, y) = \frac{\alpha}{\alpha + \beta} \min_{(i,j) \in \Omega(x,y)} \left( \min_{c \in (r,g,b)} J^c(x, y) \right) + \qquad \text{Eq. (1)}$$

$$\frac{\beta}{\alpha + \beta} \min_{(i,j) \in \mu(x,y)} \left( \min_{c \in (r,g,b)} J^c(x, y) \right)$$

where $J^c$ represents the de-hazed image to be obtained in the color channel c; $\Omega(x,y)$ and $\mu(x,y)$ respectively represent the large local patch and the small local patch centered at (x,y);

$$\frac{\alpha}{\alpha + \beta} \text{ and } \frac{\beta}{\alpha + \beta}$$

respectively represent the first weight and the second weight; $J^{dark}(x,y)$ represents the hybrid dark channel corresponding to the input pixel at (x,y), $$\frac{\alpha}{\alpha + \beta} \min_{(i,j) \in \Omega(x,y)} \left( \min_{c \in (r,g,b)} J^c(x, y) \right)$$

represents the first weighted minimum dark channel, and $$\frac{\beta}{\alpha + \beta} \min_{(i,j) \in \mu(x,y)} \left( \min_{c \in (r,g,b)} J^c(x, y) \right)$$

represents the second weighted minimum dark channel;

$$\min_{(i,j) \in \Omega(x,y)} \left( \min_{c \in (r,g,b)} J^c(x, y) \right)$$

represents the first minimum dark channel, and $$\min_{(i,j) \in \mu(x,y)} \left( \min_{c \in (r,g,b)} J^c(x, y) \right)$$

represents the second minimum dark channel.

According to an exemplary embodiment of the disclosure, the HDCP module sets the corresponding hybrid dark channel to zero for each of the input pixels and obtains the transmission map for each of the input pixels according to an optical model and the corresponding hybrid dark channel, where the optical model is constructed based on the atmospheric light associated with the input hazy image in each of the channels.

According to an exemplary embodiment of the disclosure, the formula that the HDCP module determines the transmission map for each of the input pixels according to the hybrid dark channel prior, the corresponding hybrid dark channel and the atmospheric light associated with the input hazy image in each of the color channels includes Eq.(2.2):

$$t_h(x, y) = 1 - \frac{\omega\alpha}{\alpha + \beta} \min_{(i,j)\in\Omega(x,y)} \left( \min_{c\in\{r,g,b\}} \frac{I^c(i,j)}{A^c} \right) - \frac{\omega\alpha}{\alpha + \beta} \min_{(i,j)\in\mu(x,y)} \left( \min_{c\in\{r,g,b\}} \frac{I^c(i,j)}{A^c} \right) \qquad \text{Eq. (2.2)}$$

where $c \in \{r,g,b\}$, $t_h$ is the transmission map, I represents the input haze image, $I^c$ represents the input haze image in the color channel c, and $\omega$ is a constant parameter ranging between 0 and 1.

According to an exemplary embodiment of the disclosure, the CA module calculates an average of the input pixels in each of the color channels respectively and accordingly calculating the color spectrum adjustment parameter corresponding to each of the color channels.

According to an exemplary embodiment of the disclosure, the formulas that the CA module determines the color spectrum adjustment parameter corresponding to each of the color channels include Eq.(3) and Eq.(4):

$$R_{avg} = \frac{1}{MN}\sum_{x=1}^{M}\sum_{y=1}^{N} I^r(x,y) \qquad \text{Eq. (3)}$$

$$G_{avg} = \frac{1}{MN}\sum_{x=1}^{M}\sum_{y=1}^{N} I^g(x,y)$$

$$B_{avg} = \frac{1}{MN}\sum_{x=1}^{M}\sum_{y=1}^{N} I^b(x,y)$$

$$\gamma^c = \frac{\frac{1}{MN}\sum_{x=1}^{M}\sum_{y=1}^{N} I^r(x,y)}{\frac{1}{MN}\sum_{x=1}^{M}\sum_{y=1}^{N} I^c(x,y)} = \frac{\sum_{x=1}^{M}\sum_{y=1}^{N} I^r(x,y)}{\sum_{x=1}^{M}\sum_{y=1}^{N} I^c(x,y)} \qquad \text{Eq. (4)}$$

where $I^r(x,y)$, $I^g(x,y)$, and $I^b(x,y)$ respectively represent the input hazy image in each of the color channels, MN represents the total number of the input pixels, and $\gamma^c$ represents the color spectrum adjustment parameter for the color channel c.

According to an exemplary embodiment of the disclosure, the VR module calculates the scene radiance for each of the input pixels in each of the color channels based on the optical model with a consideration of the corresponding color spectrum adjustment parameter and a corresponding atmospheric adjustment parameter.

According to an exemplary embodiment of the disclosure, the formulas that the VR module recovers the scene radiance for each of the input pixels in each of the color channels according to the corresponding color spectrum adjustment parameter, the transmission map, and the corresponding atmospheric light so as to produce the de-hazed image include Eq.(5), Eq.(5.1), and Eq.(5.2):

$$J^c(x,y) = \frac{\gamma^c(I^c(x,y) - A^c)}{\max(t_h(x,y), t_0)} + A^c + \sigma^2(\gamma^c - 1) \qquad \text{Eq. (5)}$$

$$PMF(I_k^c) = \frac{n_k^c}{MN}, \qquad \text{Eq. (5.1)}$$

for $k = 0, 1, \ldots, L$ $$\sigma^r = \text{argmax}_{0 \le k \le L-1} PMF(I_k^r) \qquad \text{Eq. (5.2)}$$

$$\sigma^g = \frac{\text{argmax}_{0 \le k \le L-1} PMF(I_k^r) + \text{argmax}_{0 \le k \le L-1} PMF(I_k^g)}{2}$$

$$\sigma^b = \frac{\text{argmax}_{0 \le k \le L-1} PMF(I_k^r) + \text{argmax}_{0 \le k \le L-1} PMF(I_k^b)}{2}$$

where $c \in \{r,g,b\}$, $J^c(x,y)$ represents the scene radiance in the de-hazed image in the color channel c, $I^c$ represents the input hazy image, $A^c$ represents the atmospheric light in the color channel c, $t_h$ represents the transmission map, $t_0$ is a lower transmission bound, $\gamma^c$ and $\sigma^c$ respectively represent the color spectrum adjustment parameter and the atmospheric adjustment parameter in the color channel c; $n_k^c$, denotes the total number of pixels with intensity $I_k^c$, L is a constant factor set equal to the maximum intensity value of the input pixels, PMF(•) denotes a probability density function.

In view of the aforementioned descriptions, the disclosure is able to effectively conceal localized light sources and restrain the formation of color shifts when a captured road image contains localized light sources or color-shift problems. Accordingly, the technique based on the hybrid dark channel prior is able to attain an effective approach for haze removal from a single image captured during different environmental conditions that not only avoids the generation of artifact effects but also recovers true color.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed. It also should be understood, that the summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
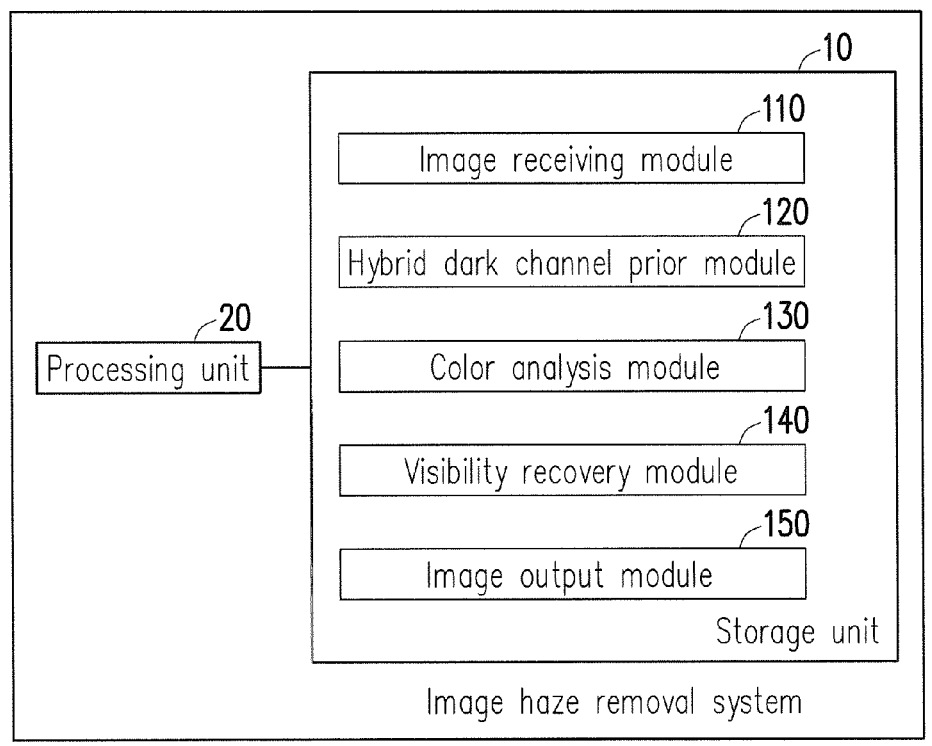
FIG. 1 illustrates an exemplary system architecture which utilizes the proposed image haze removal method from the hardware perspective in accordance with one of the exemplary embodiments of the disclosure.

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the present invention.

FIG. 1 illustrates an exemplary system architecture which utilizes the proposed image haze removal method from the hardware perspective in accordance with one of the exemplary embodiments of the disclosure. Referring to FIG. 1, an image haze removal system 100 may include a storage unit 10 and a processing unit 20, where the processing unit 20 is coupled to the storage unit 10.

The image haze removal system 100 may be externally connected to or built-in in an electronic device such as a personal computer, a laptop computer, a digital camera, a digital camcorder, a web camera, a smart phone, a tabular computer, an event data recorder, a vehicle audio and video system, and so forth.

The storage unit 10 may be one or a combination of a stationary or mobile random access memory (RAM), a read-only memory (ROM), a flash memory, a hard drive or other similar devices. The storage unit 10 is configured to record a plurality of modules executable by the processing unit 20. The modules include an image receiving module 110, a hybrid dark channel prior (HDCP) module 120, a color analysis (CA) module 130, a visibility recovery (VR) module 140, and an image output module 150. The modules may be loaded into the processing unit 20 for removing haze from a digital image.

The processing unit 20 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of aforementioned devices. The processing unit 20 is capable of accessing and executing the modules recorded in the storage unit 10 and would be used to perform the image haze removal method as proposed.

Figure 2:
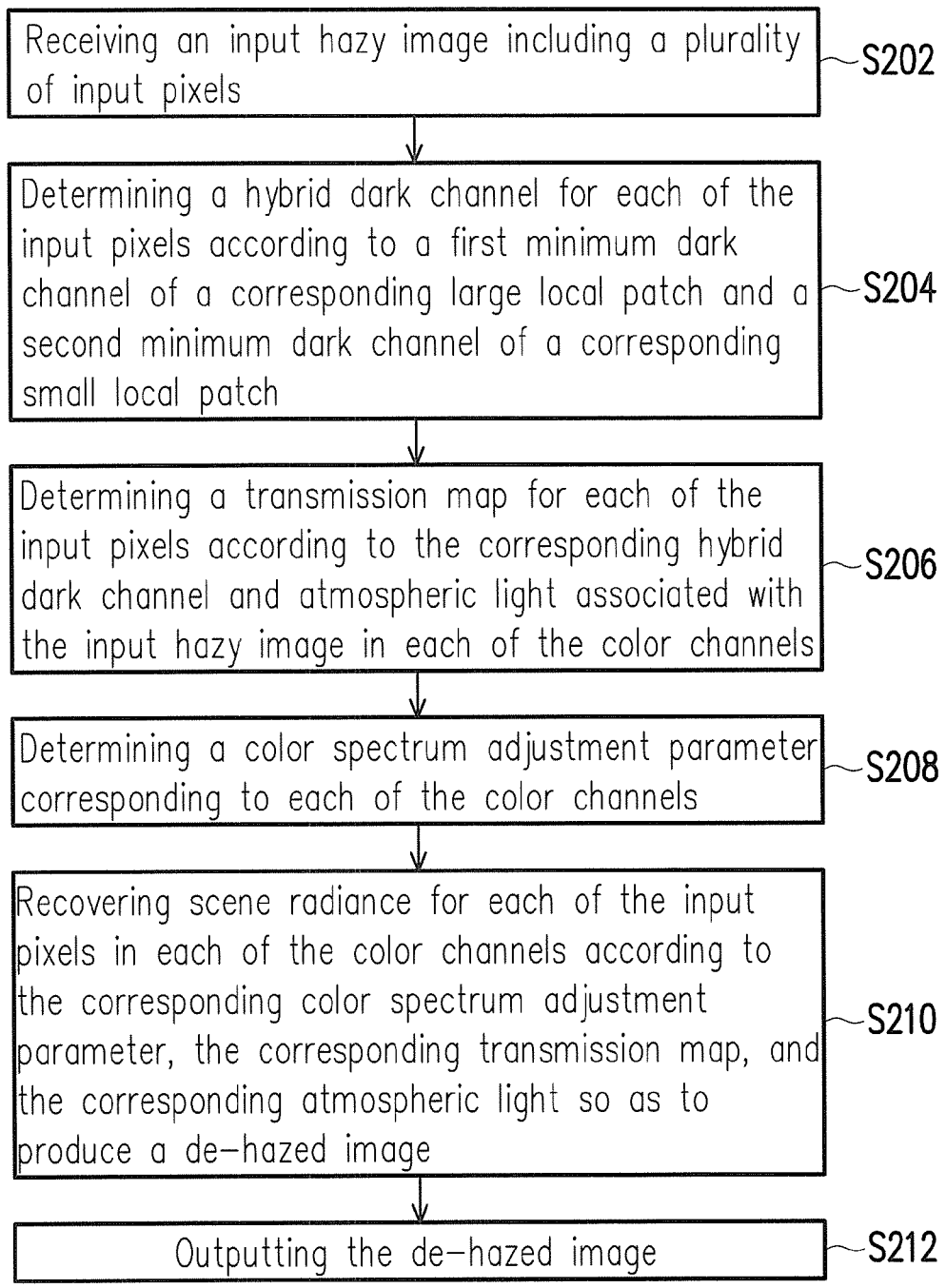
FIG. 2 illustrates a flowchart of an image haze removal method in accordance with one of the exemplary embodiments of the disclosure.

FIG. 2 illustrates a flowchart of an image haze removal method in accordance with one of the exemplary embodiments of the disclosure. The method proposed in the present embodiment may be performed by the image haze removal system 100 of FIG. 1.

Referring to both FIG. 1 and FIG. 2, the image receiving module 110 first receives an input hazy image including a plurality of input pixels (Step S202). In the present embodiment, the proposed method is built in an RGB color space via three color channels, where the three color channels are red (R), green (G), and blue (B).

The conventional dark channel prior technique may work decently for haze removal in a captured image that lacks of localized light sources. Such conventional technique may employ large patch size operation on the captured image in order to acquire correct atmospheric light. However, the use of a large local patch would result in invariable transmission and thereby lead to halo effects in a recovered image. By contrast, when a small patch size is employed, localized light would be misjudged as atmospheric light. Hence, the HDCP module 120 determines a hybrid dark channel for each of the input pixels according to a first minimum dark channel of a corresponding large local patch and a second minimum dark channel of a corresponding small local patch (Step S204). The HDCP module 120 may ensure correct atmospheric light estimation and the subsequent avoidance of halo effects when removing haze from the input hazy image based on the proposed hybrid dark channel prior technique.

To effectively estimate the density of the haze in the input hazy image, the HDCP module 120 may combine the advantages of small and large patch sizes via different weight allocations. It should be noted that, each of the input pixels would be processed identically, and thus only one will be illustrated and described. To be specific, with respect to the input pixel being processed, the HDCP module 120 may calculate the first minimum dark channel by performing a minimum operation on the input pixels of the corresponding large local patch (referred to as "large local patch pixels") in each of the color channels and perform a minimum filter on the corresponding large local patch. Moreover, the HDCP module 120 may calculate the second minimum dark channel by performing the minimum operation on the input pixels of the corresponding small local patch (referred to as "small local patch pixels") in each of the color channels and perform the minimum filter on the corresponding small local patch. The HDCP module 120 may allocate a first weight to the first minimum dark channel and a second weight to the second minimum dark channel so as to respectively obtain a first weighted minimum dark channel and a second weighted minimum dark channel, where the first weight and the second weight are positive values between 0 and 1, and the summation of the first weight and the second weight is 1. The HDCP module 120 may then obtain the hybrid dark channel corresponding to the input pixel being processed by combining the first weighted minimum dark channel and the second weighted.

In an exemplary embodiment, the HDCP module 120 may determine the hybrid dark channel according to Eq.(1):

$$J^{dark}(x, y) = \frac{\alpha}{\alpha + \beta} \min_{(i,j) \in \Omega(x,y)} \left( \min_{c \in (r,g,b)} J^c(x, y) \right) + \frac{\beta}{\alpha + \beta} \min_{(i,j) \in \mu(x,y)} \left( \min_{c \in (r,g,b)} J^c(x, y) \right) \quad \text{Eq. (1)}$$

where $J^c$ represents the de-hazed image to be obtained in the color channel c; $\Omega(x,y)$ and $\mu(x,y)$ respectively represent the large local patch and the small local patch centered at (x,y);

$$\frac{\alpha}{\alpha + \beta} \text{ and } \frac{\beta}{\alpha + \beta}$$

represent the first weight and the second weight; $J^{dark}(x,y)$ represents the hybrid dark channel corresponding to the input pixel at (x,y)

$$\frac{\alpha}{\alpha + \beta} \min_{(i,j) \in \Omega(x,y)} \left( \min_{c \in (r,g,b)} J^c(x, y) \right)$$

represents the first weighted minimum dark channel, and $$\frac{\beta}{\alpha+\beta} \min_{(i,j)\in\mu(x,y)} \left( \min_{c\in(r,g,b)} J^c(x, y) \right)$$

represents the second weighted minimum dark channel;

$$\min_{(i,j)\in\Omega(x,y)} \left( \min_{c\in(r,g,b)} J^c(x, y) \right)$$

represents the first minimum dark channel, and $$\min_{(i,j)\in\mu(x,y)} \left( \min_{c\in(r,g,b)} J^c(x, y) \right)$$

represents the second minimum dark channel.

Figure 3:
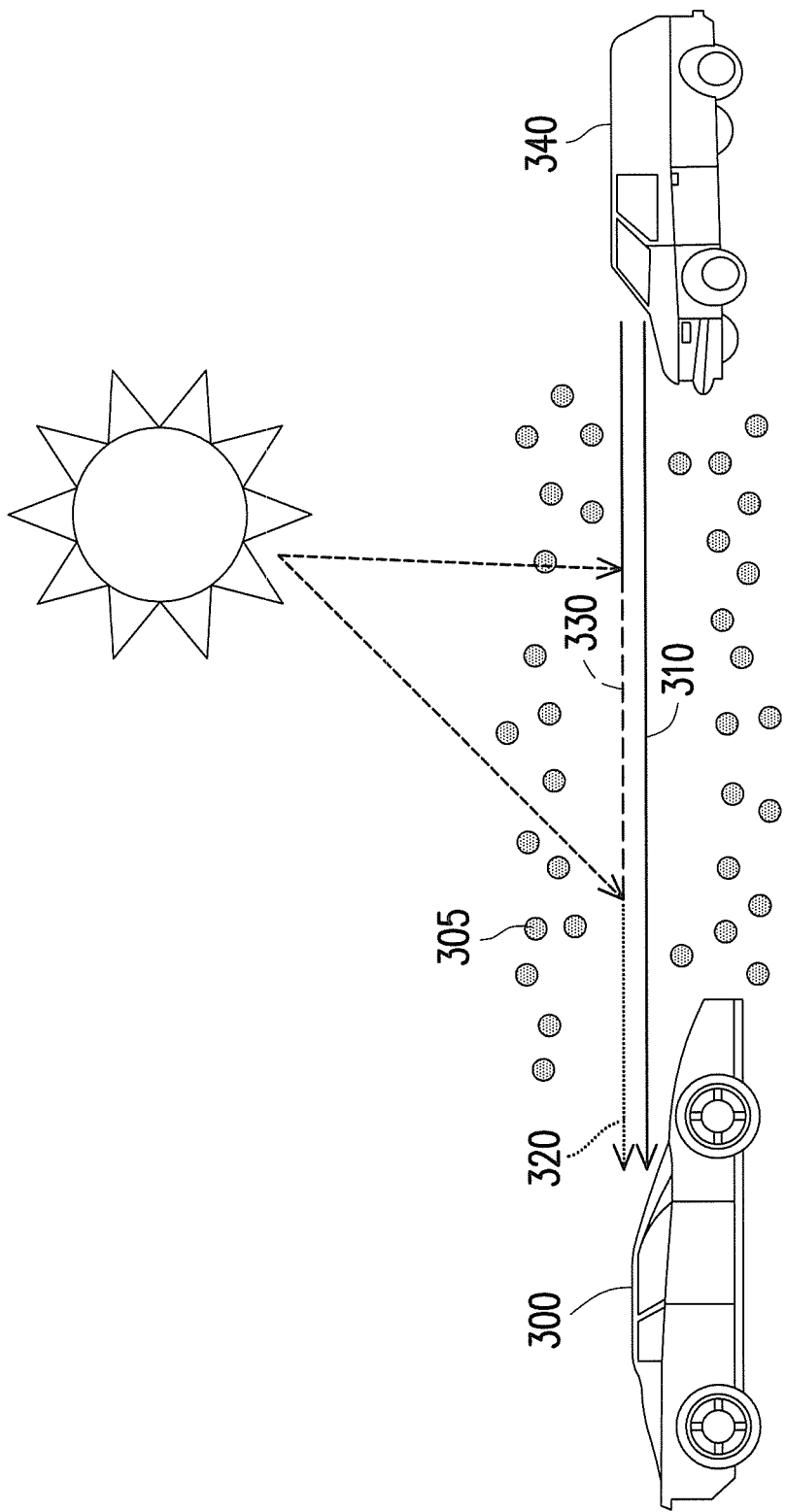
FIG. 3 illustrates an optical model that describes hazy image information under atmospheric conditions in accordance with one of the exemplary embodiments of the disclosure.

In computer vision and pattern analysis, an optical model is widely used to describe a hazy image under realistic atmospheric conditions in the RGB color space as $$I^c(x,y) = J^c(x,y)t(x,y) + A^c(1-t(x,y)) \quad \text{Eq.(1.1)}$$

where $c \in \{r,g,b\}$, $I^c(x,y)$ represents a captured image, $J^c(x,y)$ represents a scene radiance, i.e., an ideal haze-free image, $A^c$ represents atmospheric light in the color channel c, and $t(x,y)$ represents a transmission map describing the portion of the light that arrives at, for example, an event data recorder of a vehicle without scattering. For example, FIG. 3 illustrates the aforementioned optical model that describes hazy image information under atmospheric conditions. The hazy image information is obtained by an event data recorder of a vehicle 300. The first term of the optical model, i.e., $J^c(x,y)t(x,y)$ represents direct attenuation 310 describing delayed scene radiance in medium 305. The second term of the optical model, i.e., $A^c(1-t(x,y))$ represents airlight 320 that resulted from scattered light 330 and leading to the color shifting in a road scene 340.

Hence, after the HDCP module 120 obtains the hybrid dark channel, it may determine a transmission map for each of the input pixels according to the corresponding hybrid dark channel and atmospheric light associated with the input hazy image in each of the color channels (Step S206). The hybrid dark channel prior is based on the observation such that the hybrid dark channel has a low intensity when an input hazy image lacks of haze, with the exception of sky regions. The hybrid dark channel value of a haze-free image is close to zero and may be represented by $$J^{dark} \to 0 \quad \text{Eq.(1.2)}$$

The HDCP module 120 may estimate the transmission map for each of the input pixels based on Eq.(1), Eq.(1.1) and Eq.(1.2) and the transmission map may be written as Eq.(2.1):

$$t_h(x, y) = 1 - \frac{\alpha}{\alpha+\beta} \min_{(i,j)\in\Omega(x,y)} \left( \min_{c\in(r,g,b)} \frac{I^c(i,j)}{A^c} \right) - \frac{\beta}{\alpha+\beta} \min_{(i,j)\in\mu(x,y)} \left( \min_{c\in(r,g,b)} \frac{I^c(i,j)}{A^c} \right) \quad \text{Eq. (2.1)}$$

where $t_h(x,y)$ is the transmission map.

Furthermore, for natural appearance, a small amount of haze for distant objects may be retained by adding a constant parameter ω to Eq.(2.1). Thus, the transmission may be expressed as Eq.(2.2):

$$t_h(x, y) = 1 - \frac{\omega\alpha}{\alpha+\beta} \min_{(i,j)\in\Omega(x,y)} \left( \min_{c\in(r,g,b)} \frac{I^c(i,j)}{A^c} \right) - \frac{\omega\beta}{\alpha+\beta} \min_{(i,j)\in\mu(x,y)} \left( \min_{c\in(r,g,b)} \frac{I^c(i,j)}{A^c} \right) \quad \text{Eq. (2.2)}$$

where ω may be set to 0.95 experimentally. It should be noted that, α and β are constants factors corresponding to a large local patch size and a small local patch size, respectively, by which the optimum results for haze removal may be acquired. The atmospheric light $A^c$ is respectively, the highest intensity pixels in the color channel c of the input hazy image according to its correspondence to the brightest 0.1% of pixels in the hybrid dark channel image $J^{dark}(x,y)$.

The particles of sand in the atmosphere caused by sandstorms absorb specific portions of the color spectrum. This phenomenon may lead to color shifts in images captured during such conditions and may result in different color channel distributions. The conventional dark channel prior technique uses the same formula for each of the color channels when recovering scene radiance, thereby causing serious color shifts in restored images. To solve such problem, the CA module 130 determines a color spectrum adjustment parameter corresponding to each of the color channels (Step S208).

To be specific, the CA module 130 is proposed based on a gray world assumption. The gray word assumption relies on the notion that average intensities should be equal in each of the color channels for a typical image. Thus, the CA module 130 may first calculate an average of the input pixels in each of the color channels respectively according to Eq.(3):

$$R_{avg} = \frac{1}{MN} \sum_{x=1}^{M} \sum_{y=1}^{N} I^r(x, y) \quad \text{Eq. (3)}$$

$$G_{avg} = \frac{1}{MN} \sum_{x=1}^{M} \sum_{y=1}^{N} I^g(x, y)$$

$$B_{avg} = \frac{1}{MN} \sum_{x=1}^{M} \sum_{y=1}^{N} I^b(x, y)$$

where $I^r(x,y)$, $I^g(x,y)$, and $I^b(x,y)$ represent the input hazy image in each of the color channels, respectively, and MN represents the total number of the input pixels. Based on this assumption, the CA module 130 may calculate the color spectrum adjustment parameter for each of the color channels in order to avoid color shifts in the restored image. This may be measured as Eq.(17):

$$\gamma^c = \frac{\frac{1}{MN}\sum_{x=1}^{M}\sum_{y=1}^{N} I^r(x,y)}{\frac{1}{MN}\sum_{x=1}^{M}\sum_{y=1}^{N} I^c(x,y)} = \frac{\sum_{x=1}^{M}\sum_{y=1}^{N} I^r(x,y)}{\sum_{x=1}^{M}\sum_{y=1}^{N} I^c(x,y)} \quad \text{Eq. (4)}$$

where $\gamma^c$ represents the color spectrum adjustment parameter for the color channel c.

Furthermore, in order to produce a high-equality haze-free image captured in different environments, the VR module 140 may combine the information provided via the HDCP module 120 and the CA module 130 to effectively recover the scene radiance. In other words, the VR module 140 recovers the scene radiance for each of the input pixels in each of the color channels according to the corresponding color spectrum adjustment parameter, the transmission map, and the corresponding atmospheric light so as to produce a de-hazed image (Step S210). In other words, the VR module 140 may calculate the scene radiance for each of the input pixels in each of the color channels based on the optical model with a consideration of the corresponding color spectrum adjustment parameter and a corresponding atmospheric adjustment parameter. This may be written as Eq.(5):

$$J^c(x,y) = \frac{\gamma^c(I^c(x,y) - A^c)}{\max(t_h(x,y), t_0)} + A^c + \sigma^c(\gamma^c - 1) \quad \text{Eq. (5)}$$

where $c \in \{r,g,b\}$, $J^c(x,y)$ represents the scene radiance in the de-hazed image in the color channel c, $I^c(x,y)$ represents the input hazy image which may be captured under different conditions, $A^c$ represents the atmospheric light in the color channel c, $t_h(x,y)$ represents the transmission map, $t_0$ is a lower transmission bound and is assumed to have a typical value of 0.1, and $\gamma^c$ and $\sigma^c$ respectively represent the color spectrum adjustment parameter and the atmospheric adjustment parameter in the color channel c.

It is noted that, since specific portions of the color spectrum may be irregularly absorbed by atmospheric particles under different weather conditions, the VR module 140 employs the aforementioned parameter σ to adjust the atmospheric variables. First, the intensity statistics of each of the color channels may be calculated for the acquisition of color information via the probability mass function (PMF), which is described as Eq.(5.1):

$$PMF(I_k^c) = \frac{n_k^c}{MN}, \quad \text{for } k = 0, 1, \ldots, L \quad \text{Eq. (5.1)}$$

where $c \in \{r,g,b\}$, MN represents the total number of the input pixels, $n_k^c$ denotes the total number of pixels with intensity $I_k^c$, and L is a constant factor set equal to the maximum intensity value of the input pixels. Ultimately, the atmospheric adjustment parameter σ in each of the color channels may be produced according to Eq.(5.2):

$$\sigma^r = \text{argmax}_{0 \leq k \leq L-1} PMF(I_k^r) \quad \text{Eq. (5.2)}$$
$$\sigma^g = \frac{\text{argmax}_{0 \leq k \leq L-1} PMF(I_k^r) + \text{argmax}_{0 \leq k \leq L-1} PMF(I_k^g)}{2}$$
$$\sigma^b = \frac{\text{argmax}_{0 \leq k \leq L-1} PMF(I_k^r) + \text{argmax}_{0 \leq k \leq L-1} PMF(I_k^b)}{2}$$

After the VR module 140 produces the de-hazed image, the output module 150 outputs the de-hazed image (Step S212), and the image haze removal system 100 completes the haze removal procedure.

Figure 4:
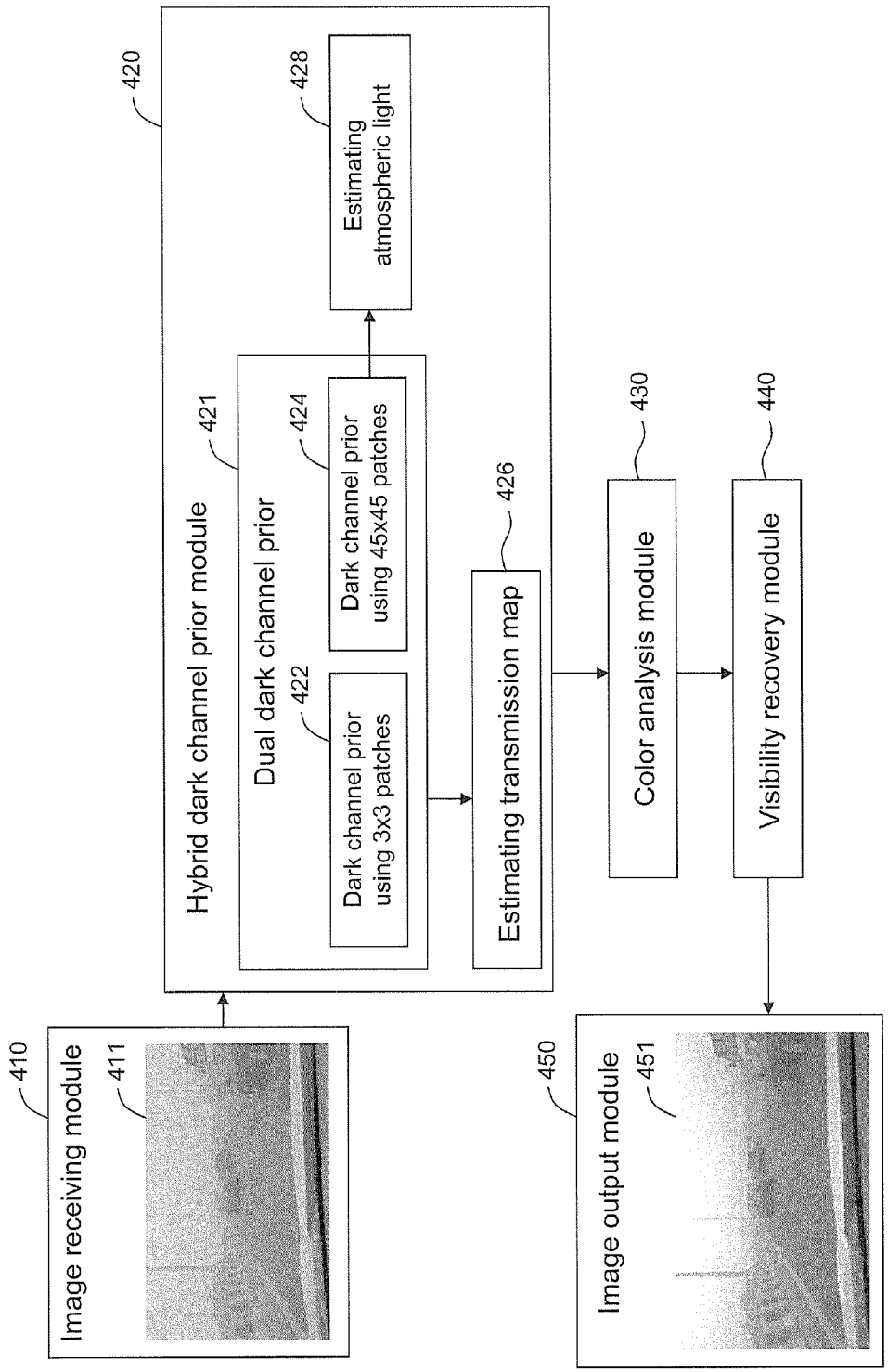
FIG. 4 illustrates an image haze removal method in terms of functional block diagrams in accordance with one of the exemplary embodiments of the disclosure.

The proposed image haze removal method may be summarized by FIG. 4 in terms of functional block diagrams in accordance with one of the exemplary embodiments of the present disclosure. Referring to FIG. 4, a HDCP module 420 receives an input hazy image 411 from an image receiving module 410. The HDCP module 420 employs the hybrid dark channel prior technique based on dual dark channel priors 421 with a combination of a dark channel prior 422 using, for example, 3×3 patches and a dark channel prior 424 using, for example, 45×45 patches. Next, the HDCP module 420 estimates a transmission map 426 and atmospheric light 428. A CA module 430 uses the gray world assumption to effectively obtain the color information of the input hazy image 411 and thereby circumvent the color-shift problems in the restored image. A VR module 440 combines the information obtained by the HDCP module 420 and the CA module 430 to avoid the generation of serious artifact effects and thus obtain a high-quality de-hazed image regardless of weather conditions. An image output module 450 outputs the de-hazed image 451 and completes the image haze removal method.

In view of the aforementioned descriptions, the disclosure is able to effectively conceal localized light sources and restrain the formation of color shifts when a captured road image contains localized light sources or color-shift problems. Accordingly, the technique based on the hybrid dark channel prior is able to attain an effective approach for haze removal from a single image captured during different environmental conditions that not only avoids the generation of artifact effects but also recovers true color.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for image haze removal based on a hybrid dark channel prior, adapted to an electronic device, comprising:
   receiving an input hazy image comprising a plurality of input pixels;
   determining a hybrid dark channel for each of the input pixels according to a first minimum dark channel of a corresponding large local patch and a second minimum dark channel of a corresponding small local patch;
   determining a transmission map for each of the input pixels according to the hybrid dark channel prior, the corresponding hybrid dark channel and atmospheric light associated with the input hazy image in each color channel, comprising:
      for each of the input pixels:
         calculating the first minimum dark channel by performing a minimum operation on each large local patch pixel of the corresponding large local patch in each of the color channels and performing a minimum filter on the corresponding large local patch;

calculating the second minimum dark channel by performing the minimum operation on each small local patch pixel of the corresponding small local patch in each of the color channels and performing the minimum filter on the corresponding small local patch;

allocating a first weight to the first minimum dark channel and a second weight to the second minimum dark channel so as to obtain a first weighted minimum dark channel and a second weighted minimum dark channel, wherein the first weight and the second weight are positive values between 0 and 1, and a summation of the first weight and the second weight is 1; and combining the first weighted minimum dark channel and the second weighted so as to obtain the hybrid dark channel;

determining a color spectrum adjustment parameter corresponding to each of the color channels;

recovering scene radiance for each of the input pixels in each of the color channels according to the corresponding color spectrum adjustment parameter, the transmission map, and the corresponding atmospheric light so as to produce a de-hazed image; and outputting the de-hazed image.

2. The method according to claim 1, wherein the formula for determining the hybrid dark channel for each of the input pixels according to the first minimum dark channel of the corresponding large local patch and the second minimum dark channel of the corresponding small local patch comprises Eq.(1):

$$J^{dark}(x, y) = \frac{\alpha}{\alpha + \beta} \min_{(i,j) \in \Omega(x,y)} \left( \min_{c \in (r,g,b)} J^c(x, y) \right) + \frac{\beta}{\alpha + \beta} \min_{(i,j) \in \mu(x,y)} \left( \min_{c \in (r,g,b)} J^c(x, y) \right) \quad \text{Eq. (1)}$$

wherein $J^c$ represents the de-hazed image to be obtained in the color channel c; $\Omega(x,y)$ and $\mu(x,y)$ respectively represent the large local patch and the small local patch centered at (x,y);

$$\frac{\alpha}{\alpha + \beta} \text{ and } \frac{\beta}{\alpha + \beta}$$

respectively represent the first weight and the second weight; $J^{dark}(x,y)$ represents the hybrid dark channel corresponding to the input pixel at (x,y), $$\frac{\alpha}{\alpha + \beta} \min_{(i,j) \in \Omega(x,y)} \left( \min_{c \in (r,g,b)} J^c(x, y) \right)$$

represents the first weighted minimum dark channel, and $$\frac{\beta}{\alpha + \beta} \min_{(i,j) \in \mu(x,y)} \left( \min_{c \in (r,g,b)} J^c(x, y) \right)$$

represents the second weighted minimum dark channel;

$$\min_{(i,j) \in \Omega(x,y)} \left( \min_{c \in (r,g,b)} J^c(x, y) \right)$$

represents the first minimum dark channel, and $$\min_{(i,j) \in \mu(x,y)} \left( \min_{c \in (r,g,b)} J^c(x, y) \right)$$

represents the second minimum dark channel.

3. The method according to claim 2, wherein the step of determining the transmission map for each of the input pixels according to the hybrid dark channel prior, the corresponding hybrid dark channel and the atmospheric light associated with the input hazy image in each of the color channels comprises:

setting the corresponding hybrid dark channel to zero for each of the input pixels; and obtaining the transmission map for each of the input pixels according to an optical model and the corresponding hybrid dark channel, wherein the optical model is constructed based on the atmospheric light associated with the input hazy image in each of the channels.

4. The method according to claim 3, wherein the formula for determining the transmission map for each of the input pixels according to the hybrid dark channel prior, the corresponding hybrid dark channel and the atmospheric light associated with the input hazy image in each of the color channels comprises Eq.(2.2):

$$t_h(x, y) = 1 - \frac{\omega\alpha}{\alpha + \beta} \min_{(i,j) \in \Omega(x,y)} \left( \min_{c \in (r,g,b)} \frac{I^c(i, j)}{A^c} \right) - \frac{\omega\beta}{\alpha + \beta} \min_{(i,j) \in \mu(x,y)} \left( \min_{c \in (r,g,b)} \frac{I^c(i, j)}{A^c} \right) \quad \text{Eq. (2.2)}$$

wherein $c \in \{r,g,b\}$, $t_h$ is the transmission map, I represents the input haze image, $I^c$ represents the input haze image in the color channel c, and $\omega$ is a constant parameter ranging between 0 and 1.

5. The method according to claim 4, wherein the step of determining the color spectrum adjustment parameter corresponding to each of the color channels comprises:

calculating an average of the input pixels in each of the color channels respectively and accordingly calculating the color spectrum adjustment parameter corresponding to each of the color channels.

6. The method according to claim 5, wherein the formulas for determining the color spectrum adjustment parameter corresponding to each of the color channels comprise Eq.(3) and Eq.(4):

$$R_{avg} = \frac{1}{MN} \sum_{x=1}^{M} \sum_{y=1}^{N} I^r(x, y) \quad \text{Eq. (3)}$$

$$G_{avg} = \frac{1}{MN} \sum_{x=1}^{M} \sum_{y=1}^{N} I^g(x, y)$$

$$B_{avg} = \frac{1}{MN} \sum_{x=1}^{M} \sum_{y=1}^{N} I^b(x, y)$$

-continued $$\gamma^c = \frac{\frac{1}{MN}\sum_{x=1}^{M}\sum_{y=1}^{N} I^r(x,y)}{\frac{1}{MN}\sum_{x=1}^{M}\sum_{y=1}^{N} I^c(x,y)} = \frac{\sum_{x=1}^{M}\sum_{y=1}^{N} I^r(x,y)}{\sum_{x=1}^{M}\sum_{y=1}^{N} I^c(x,y)} \quad \text{Eq. (4)}$$

wherein $I^r(x,y)$, $I^g(x,y)$, and $I^b(x,y)$ respectively represent the input hazy image in each of the color channels, MN represents the total number of the input pixels, and $\gamma^c$ represents the color spectrum adjustment parameter for the color channel c.

7. The method according to claim 6, wherein the step of recovering the scene radiance for each of the input pixels in each of the color channels according to the corresponding color spectrum adjustment parameter, the transmission map, and the corresponding atmospheric light so as to produce the de-hazed image comprises:

calculating the scene radiance for each of the input pixels in each of the color channels based on the optical model with a consideration of the corresponding color spectrum adjustment parameter and a corresponding atmospheric adjustment parameter.

8. The method according to claim 7, wherein the formulas for recovering the scene radiance for each of the input pixels in each of the color channels according to the corresponding color spectrum adjustment parameter, the transmission map, and the corresponding atmospheric light so as to produce the de-hazed image comprise Eq.(5), Eq.(5.1), and Eq.(5.2):

$$J^c(x,y) = \frac{\gamma^c(I^c(x,y) - A^c)}{\max(t_h(x,y), t_0)} + A^c + \sigma^c(\gamma^c - 1) \quad \text{Eq. (5)}$$

$$PMF(I_k^c) = \frac{n_k^c}{MN}, \quad \text{for } k = 0, 1, \ldots, L \quad \text{Eq. (5.1)}$$

$$\sigma^r = \text{argmax}_{0 \le k \le L-1} PMF(I_k^r) \quad \text{Eq. (5.2)}$$
$$\sigma^g = \frac{\text{argmax}_{0 \le k \le L-1} PMF(I_k^r) + \text{argmax}_{0 \le k \le L-1} PMF(I_k^g)}{2}$$
$$\sigma^b = \frac{\text{argmax}_{0 \le k \le L-1} PMF(I_k^r) + \text{argmax}_{0 \le k \le L-1} PMF(I_k^b)}{2}$$

wherein $c \in \{r,g,b\}$, $J^c(x,y)$ represents the scene radiance in the de-hazed image in the color channel c, $I^c(x,y)$ represents the input hazy image, $A^c$ represents the atmospheric light in the color channel c, $t_h$ represents the transmission map, $t_0$ is a lower transmission bound, $\gamma^c$ and $\sigma^c$ respectively represent the color spectrum adjustment parameter and the atmospheric adjustment parameter in the color channel c; $n_k^c$ denotes the total number of pixels with intensity $I_k^c$, L is a constant factor set equal to the maximum intensity value of the input pixels, PMF(•) denotes a probability density function.

9. An image haze removal system, comprising:
a memory; and
a processor, coupled to the memory and configured for:
receiving an input hazy image comprising a plurality of input pixels;
determining a hybrid dark channel for each of the input pixels according to a first minimum dark channel of a corresponding large local patch and a second minimum dark channel of a corresponding small local patch, comprising for each of the input pixels:
calculating the first minimum dark channel by performing a minimum operation on each large local patch pixel of the corresponding large local patch in each of the color channels and performing a minimum filter on the corresponding large local patch;
calculating the second minimum dark channel by performing the minimum operation on each small local patch pixel of the corresponding small local patch in each of the color channels and performing the minimum filter on the corresponding small local patch;
allocating a first weight to the first minimum dark channel and a second weight to the second minimum dark channel so as to obtain a first weighted minimum dark channel and a second weighted minimum dark channel, wherein the first weight and the second weight are positive values between 0 and 1, and a summation of the first weight and the second weight is 1; and
combining the first weighted minimum dark channel and the second weighted so as to obtain the hybrid dark channel;
determining a transmission map for each of the input pixels according to the hybrid dark channel prior, the corresponding hybrid dark channel and atmospheric light associated with the input hazy image in each color channel;
determining a color spectrum adjustment parameter corresponding to each of the color channels;
recovering scene radiance for each of the input pixels in each of the color channels according to the corresponding color spectrum adjustment parameter, the transmission map, and the corresponding atmospheric light so as to produce a de-hazed image; and
outputting the de-hazed image.

10. The image haze removal system of claim 9, wherein the formulas that processor determines the hybrid dark channel for each of the input pixels according to the first minimum dark channel of the corresponding large local patch and the second minimum dark channel of the corresponding small local patch include Eq.(1):

$$J^{dark}(x,y) = \frac{\alpha}{\alpha+\beta} \min_{(i,j)\in\Omega(x,y)}\left(\min_{c\in(r,g,b)} J^c(x,y)\right) + \quad \text{Eq. (1)}$$
$$\frac{\beta}{\alpha+\beta} \min_{(i,j)\in\mu(x,y)}\left(\min_{c\in(r,g,b)} J^c(x,y)\right)$$

wherein $J^c$ represents the de-hazed image to be obtained in the color channel c; $\Omega(x,y)$ and $\mu(x,y)$ respectively represent the large local patch and the small local patch centered at (x,y);

$$\frac{\alpha}{\alpha+\beta} \text{ and } \frac{\beta}{\alpha+\beta}$$

respectively represent the first weight and the second weight; $J^{dark}(x,y)$ represents the hybrid dark channel corresponding to the input pixel at (x,y), $$\frac{\alpha}{\alpha+\beta} \min_{(i,j)\in\Omega(x,y)}\left(\min_{c\in(r,g,b)} J^c(x,y)\right)$$

represents the first weighted minimum dark channel, and $$\frac{\beta}{\alpha+\beta} \min_{(i,j)\in\mu(x,y)} \left( \min_{c\in(r,g,b)} J^c(x, y) \right)$$

represents the second weighted minimum dark channel;

$$\min_{(i,j)\in\Omega(x,y)} \left( \min_{c\in(r,g,b)} J^c(x, y) \right)$$

represents the first minimum dark channel, and $$\min_{(i,j)\in\mu(x,y)} \left( \min_{c\in(r,g,b)} J^c(x, y) \right)$$

represents the second minimum dark channel.

11. The image haze removal system of claim 10, wherein the processor sets the corresponding hybrid dark channel to zero for each of the input pixels and obtains the transmission map for each of the input pixels according to an optical model and the corresponding hybrid dark channel, wherein the optical model is constructed based on the atmospheric light associated with the input hazy image in each of the channels.

12. The image haze removal system of claim 11, wherein the formula that the processor determines the transmission map for each of the input pixels according to the hybrid dark channel prior, the corresponding hybrid dark channel and the atmospheric light associated with the input hazy image in each of the color channels comprises Eq.(2.2):

$$t_h(x, y) = 1 - \frac{\omega\alpha}{\alpha+\beta} \min_{(i,j)\in\Omega(x,y)} \left( \min_{c\in(r,g,b)} \frac{I^c(i, j)}{A^c} \right) - \frac{\omega\beta}{\alpha+\beta} \min_{(i,j)\in\mu(x,y)} \left( \min_{c\in(r,g,b)} \frac{I^c(i, j)}{A^c} \right) \quad \text{Eq. (2.2)}$$

wherein $t_h$ is the transmission map, I represents the input haze image, $I^c$ represents the input haze image in the color channel c, and ω is a constant parameter ranging between 0 and 1.

13. The image haze removal system of claim 12, wherein the processor calculates an average of the input pixels in each of the color channels respectively and accordingly calculating the color spectrum adjustment parameter corresponding to each of the color channels.

14. The image haze removal system of claim 13, wherein the formulas that the processor determines the color spectrum adjustment parameter corresponding to each of the color channels comprise Eq.(3) and Eq.(4):

$$R_{avg} = \frac{1}{MN} \sum_{x=1}^{M} \sum_{y=1}^{N} I^r(x, y) \quad \text{Eq. (3)}$$

$$G_{avg} = \frac{1}{MN} \sum_{x=1}^{M} \sum_{y=1}^{N} I^g(x, y)$$

$$B_{avg} = \frac{1}{MN} \sum_{x=1}^{M} \sum_{y=1}^{N} I^b(x, y)$$

$$\gamma^c = \frac{\frac{1}{MN} \sum_{x=1}^{M} \sum_{y=1}^{N} I^r(x, y)}{\frac{1}{MN} \sum_{x=1}^{M} \sum_{y=1}^{N} I^c(x, y)} = \frac{\sum_{x=1}^{M} \sum_{y=1}^{N} I^r(x, y)}{\sum_{x=1}^{M} \sum_{y=1}^{N} I^c(x, y)} \quad \text{Eq. (4)}$$

wherein $I^r(x,y)$, $I^g(x,y)$, and $I^b(x,y)$ respectively represent the input hazy image in each of the color channels, MN represents the total number of the input pixels, and $\gamma^c$ represents the color spectrum adjustment parameter for the color channel c.

15. The image haze removal system of claim 14, wherein the processor calculates the scene radiance for each of the input pixels in each of the color channels based on the optical model with a consideration of the corresponding color spectrum adjustment parameter and a corresponding atmospheric adjustment parameter.

16. The image haze removal system of claim 15, wherein the formulas that the processor recovers the scene radiance for each of the input pixels in each of the color channels according to the corresponding color spectrum adjustment parameter, the transmission map, and the corresponding atmospheric light so as to produce the de-hazed image comprise Eq.(5), Eq.(5.1), and Eq.(5.2):

$$J^c(x, y) = \frac{\gamma^c(I^c(x, y) - A^c)}{\max(t_h(x, y), t_0)} + A^c + \sigma^c(\gamma^c - 1) \quad \text{Eq. (5)}$$

$$PMF(I_k^c) = \frac{n_k^c}{MN}, \quad \text{for } k = 0, 1, \ldots, L \quad \text{Eq. (5.1)}$$

$$\sigma^r = \text{argmax}_{0\leq k\leq L-1} PMF(I_k^r) \quad \text{Eq. (5.2)}$$

$$\sigma^g = \frac{\text{argmax}_{0\leq k\leq L-1} PMF(I_k^r) + \text{argmax}_{0\leq k\leq L-1} PMF(I_k^g)}{2}$$

$$\sigma^b = \frac{\text{argmax}_{0\leq k\leq L-1} PMF(I_k^r) + \text{argmax}_{0\leq k\leq L-1} PMF(I_k^b)}{2}$$

wherein $c \in \{r,g,b\}$, $J^c$ represents the scene radiance in the de-hazed image in the color channel c, $I^c$ represents the input hazy image, $A^c$ represents the atmospheric light in the color channel c, $t_h$ represents the transmission map, $t_0$ is a lower transmission bound, $\gamma^c$ and $\sigma^c$ respectively represent the color spectrum adjustment parameter and the atmospheric adjustment parameter in the color channel c; $n_k^c$ denotes the total number of pixels with intensity $I_k^c$, L is a constant factor set equal to the maximum intensity value of the input pixels, PMF(•) denotes a probability density function.

\* \* \* \* \*